I. N. BEVANS.
Car Starter.

No. 79,529.

Patented June 30, 1868.

United States Patent Office.

IRA N. BEVANS, OF THOMASTON, ASSIGNOR TO HIMSELF, JOHN H. ALCOTT, AND GEORGE G. GRISWOLD, OF PLYMOUTH, CONNECTICUT.

Letters Patent No. 79,529, dated June 30, 1868.

IMPROVED CAR-STARTER.

The Schedule referred to in these Letters Patent and making part of the same.

TO ALL WHOM IT MAY CONCERN:

Be it known that I, IRA N. BEVINS, of Thomaston, in the county of Litchfield, and State of Connecticut, have invented a new and useful Improvement in Car-Starters; and I do hereby declare the following to be a full, clear, and exact description of the same, reference being had to the accompanying drawings, which are made part of this specification, and in which—

Similar letters of reference indicate corresponding parts in the two figures.

The subject of this invention is more particularly designed for application to horse-cars, but it may be applied to other conveyances, as it is a mechanical agency intended to assist the horses in giving the initial movement to or overcoming the inertia of the vehicle in starting.

A lever, connected to a sliding tongue or draught-rod, is made to act upon a ratchet-wheel keyed centrally upon the axle, and the carrying-wheels are made fast to the latter, so as to simultaneously rotate therewith, and thereby enable the vehicle to be put in motion without subjecting the horses to the unusual exertion and strain which are generally observable in the starting of street-cars.

I am aware that a lever has heretofore been employed in the manner above stated. The present invention consists in a peculiar construction of and mode of applying a lever to assist in starting the car, and in the employment of a spring-catch, or other suitable detaining-device, for the purpose of securing the rigidity or fixedness of the tongue or draught-rod after the vehicle has started.

In order that others skilled in the art to which my invention appertains may be enabled to fully understand and use the same, I will proceed to describe it in connection with the accompanying drawings.

Figure 1:
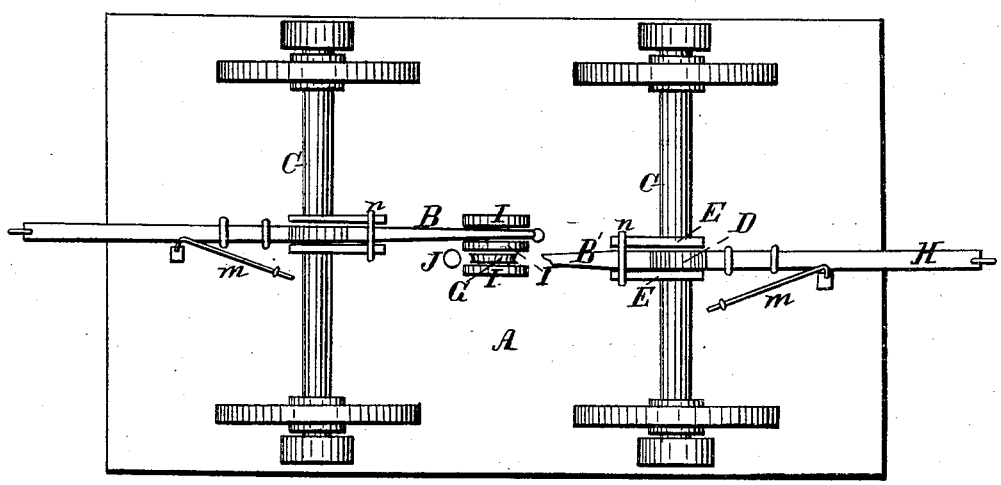
Figure 1 represents the under side view of a street-car with my invention applied.

A may represent the bottom or substructure of a car, upon which is erected or supported the body. In fig. 1, it is shown as inverted, in order to clearly present to the view the various parts which are concerned in starting the car.

B B' are two similar levers, employed, respectively with their several adjuncts, in connection with the two axles C C'. If the axle C' be the forward one, the lever B', pertaining thereto, is brought into requisition, while the lever B, pertaining to axle C, remains idle, and vice versa. A description of the operation of one lever, and of its accessories, will suffice, and without specific allusion to lever B, I will regard the lever B' as belonging to the forward axle, and proceed with the description upon that supposition.

Figure 2:
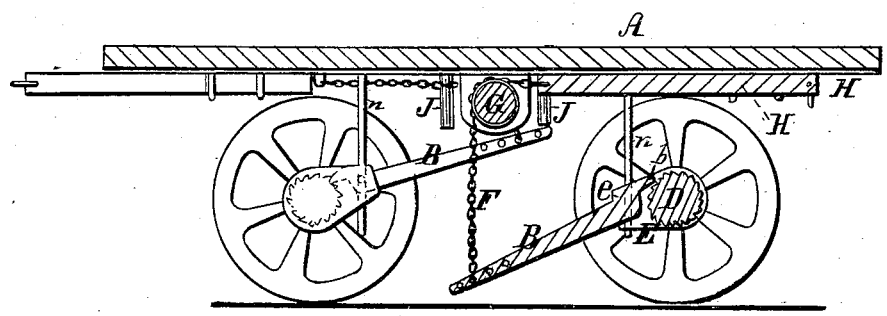
Figure 2 is a sectional side elevation of the same.

The axle C' is provided, at or near its mid-length, with a ratchet or toothed wheel, D, which, being fast, imparts to the axle any rotary motion it may receive. E E are lugs or ears, fitted loosely upon the axle C', and connected together by the pin e, which compels said lugs to maintain their positions at the opposite sides of the ratchet-wheel D. The pin e also affords a means of pivotal attachment between the lever B' and the lugs E E. The forward end, b, of the lever B', is made in the shape of a pawl or detent, as shown in fig. 2. F is a chain, connected to the lever B' at a variable point near the rear end of said lever, and the chain passes thence over a pulley, G, journalled in suitable bearings, I, secured to the bottom of the car-body, and thence forward to the tongue H, to the rear end of which said chain is made fast, as shown in fig. 2. In fig. 1, the chain is not shown, and a portion of the lever B' is represented as broken away, so as to expose the pulley G to view. When the rear end of the lever B' is depressed, and the draught-rod H retracted as shown, said draught-rod, if drawn upon by the horses, moves forward to the position shown in fig. 2, and in so doing raises the rear end of the lever B' through the medium of the chain F. While the lever B' is undergoing this vibrating movement, its forward end, b, takes into the teeth of the wheel D, and thus compels the forward axle and the forward carrying-wheel to turn. The force required to start the car, as thus transmitted through the lever B', is very small in comparison with that required when the vehicle has to be moved by the horses, unaided by mechanical means. As soon as the rear end of the lever B' reaches the extremity of its upward movement, it comes to rest in contact with the projection or stop J, and the continued action of the chain upon said lever has the effect to disengage the end *b* from the wheel D. The draught-rod H can then slide forward no further, and the car being by that time fairly started, is impelled upon its course by the sheer power of the horses.

When the car is under way, it is desirable to have the draught-rod immovable in respect to the car. It has been seen that when the draught-rod H has moved forward to a certain extent, its further motion in that direction is prevented by the contact of the end of lever B' with the projection J. In order to hold the draught-rod H in this advanced position, and effectually prevent its backward movement for as long a time as may be desired, I have applied to the under side of the car-body or bottom, A, a spring-catch, *m*, one end of which is made fast, while the other is free to be sprung into a notch in the draught-rod H, as shown in fig. 1. This catch *m* is sufficiently strong to retain the draught-rod in its forward position, and by its means the draught-rod is made rigid or immovable in respect to the car, as soon as the latter has been fairly started. The catch *m* may be bent, and made to extend upward through the platform of the car, so that the driver can with his foot push the catch away from the draught-rod, to permit the latter to be retracted preparatory to starting.

*n* may represent an adjustable rest for the lever B' and legs E, when in the depressed position.

Having thus described my invention, what I claim as new herein, and desire to secure by Letters Patent, is—

The lever B', so constructed and applied as to act directly upon the ratchet-wheel D, and employed in combination with the lugs E, sliding draught-rod or bar H, chain F, pulley G, and catch *m*, arranged and operating in the manner and for the purpose explained.

To the above specification of my new and useful improvement in car-starters, I have signed my name, this seventh day of May, 1868.

IRA N. BEVANS.

Witnesses:
V. R. C. GIDDINGS,
DAVID SHELTON.